United States Patent [19]

Schimion et al.

[11] Patent Number: 5,417,850
[45] Date of Patent: May 23, 1995

[54] BAND FILTER FOR REMOVING FOREIGN MATERIAL PARTICLES FROM LIQUID BATHS

[75] Inventors: Werner Schimion, Hilchenbach; Joachim Kuhlmann, Kreuztal; Karl J. Bertrand, Neuss; Hubert Jung, Hilchenbach, all of Germany

[73] Assignee: SMS Schloemann-Siemag Aktiengesellschaft, Düsseldorf, Germany

[21] Appl. No.: 878,158

[22] Filed: May 4, 1992

[30] Foreign Application Priority Data

May 4, 1991 [DE] Germany .................. 41 41 603.4

[51] Int. Cl.$^6$ .................. B01D 33/056; B03C 1/30
[52] U.S. Cl. .................. 210/111; 210/123; 210/223; 210/196; 210/232; 210/237; 210/298; 210/387; 210/401; 210/416.1
[58] Field of Search ............. 210/111, 123, 223, 297, 210/167, 168, 298, 387, 401, 416.1, 416.5, 232, 237, 196

[56] References Cited

U.S. PATENT DOCUMENTS

| | | | |
|---|---|---|---|
| 2,829,774 | 4/1958 | Muller | 210/123 |
| 2,851,163 | 9/1958 | Anderson | 210/387 |
| 3,083,831 | 4/1963 | Fowler | 210/387 |
| 3,087,620 | 4/1963 | Hirs | 210/387 |
| 3,333,705 | 8/1967 | Lee | 210/387 |
| 3,347,378 | 10/1967 | Arnold | |
| 3,506,128 | 4/1970 | Pashaian | |
| 3,618,772 | 11/1971 | Dietrick | 210/387 |
| 3,704,787 | 12/1972 | Norton | 210/387 |
| 3,836,006 | 9/1974 | Davis | 210/401 |
| 4,062,780 | 12/1977 | Estabrook | 210/401 |
| 4,071,451 | 1/1978 | Wood | 210/413 |
| 4,110,218 | 8/1978 | Marriott | 210/223 |
| 4,137,169 | 1/1979 | El-Hindi | 210/406 |
| 4,201,675 | 5/1980 | Dameran | 210/387 |
| 4,274,961 | 6/1981 | Hirs | 210/387 |
| 4,370,228 | 1/1983 | Tashiro | 210/223 |
| 4,448,683 | 5/1984 | Green | 210/106 |
| 4,661,251 | 4/1987 | Wykoff | 210/401 |
| 4,693,836 | 9/1987 | Willson | 210/387 |
| 4,880,538 | 11/1989 | Barcomb | 210/387 |
| 5,221,468 | 6/1993 | Fox | 210/401 |

FOREIGN PATENT DOCUMENTS

| | | |
|---|---|---|
| 2115781 | 10/1972 | Germany . |
| 2306880 | 8/1974 | Germany . |
| 2816378 | 10/1979 | Germany . |
| 1103055 | 2/1968 | United Kingdom . |

Primary Examiner—Thomas M. Lithgow
Attorney, Agent, or Firm—Anderson Kill Olick & Oshinsky

[57] ABSTRACT

A band filter for the removal of foreign material particles from liquid baths, including a tub filled with liquid, guide rollers for a filter band arranged within the tub bath, the band being introduced into the tub from one side, guided with a spacing above the bottom of the tub and subsequently again conveyed out of the tub towards the top. The filter band being configured as a powered endless screen tissue band or as a filter fleece which is placed upon a support belt that is also driven in an endless manner. The filter fleece can in this case be unwound or reeled off a roller arranged outside of the tub, and a negative pressure chamber receiving the filtered liquid is arranged beneath the filter band. The faces of the filter band facing the bottom of the tub lie on a plurality of support faces extending transversely to the guidance direction of the filter band so as to be spaced from each other and parallel next to each other. Contact pressure rollers can be placed upon or lifted off the faces of the filter band facing away from the bottom, which contact pressure rollers are arranged in the tub.

12 Claims, 11 Drawing Sheets

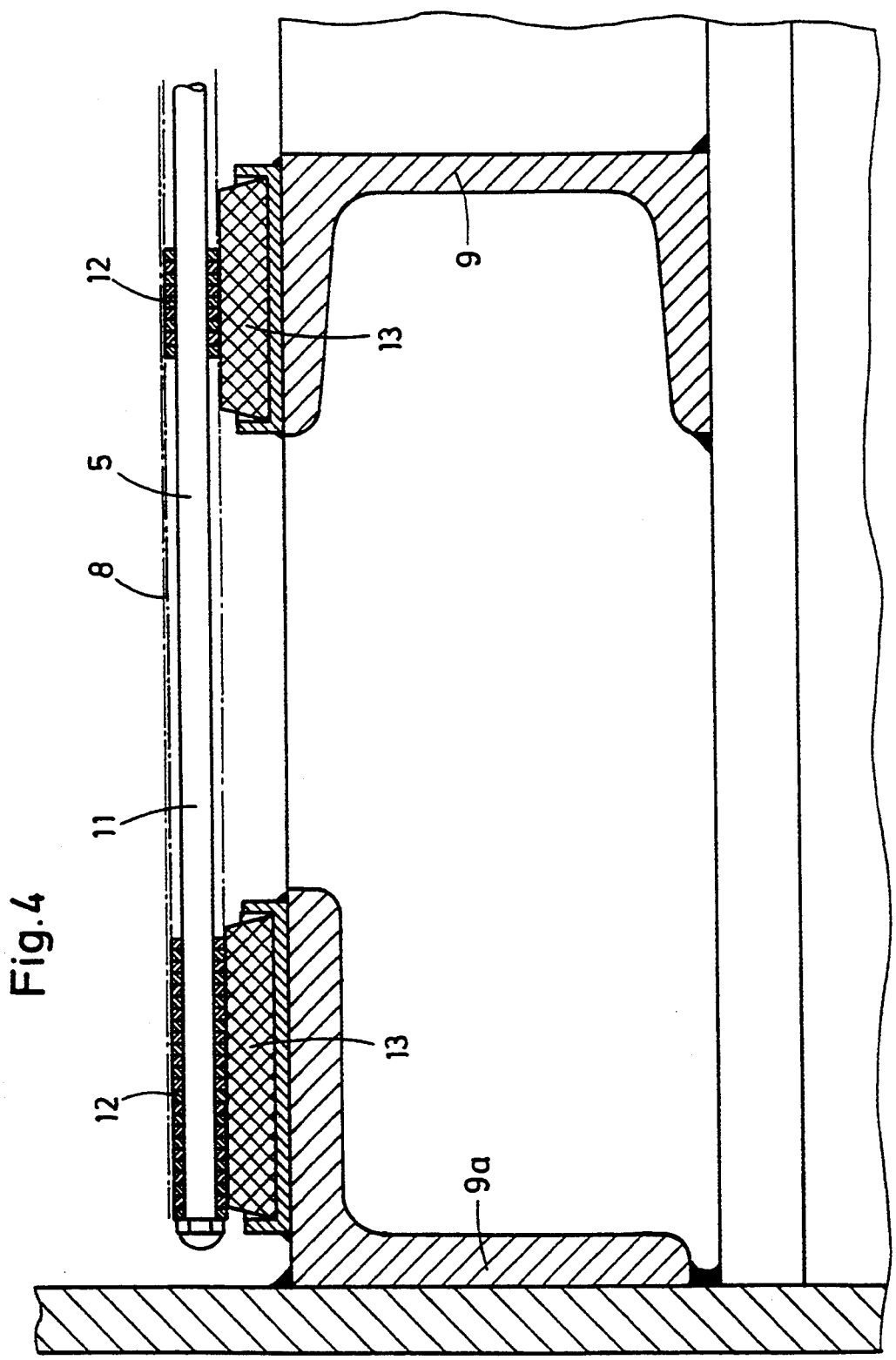

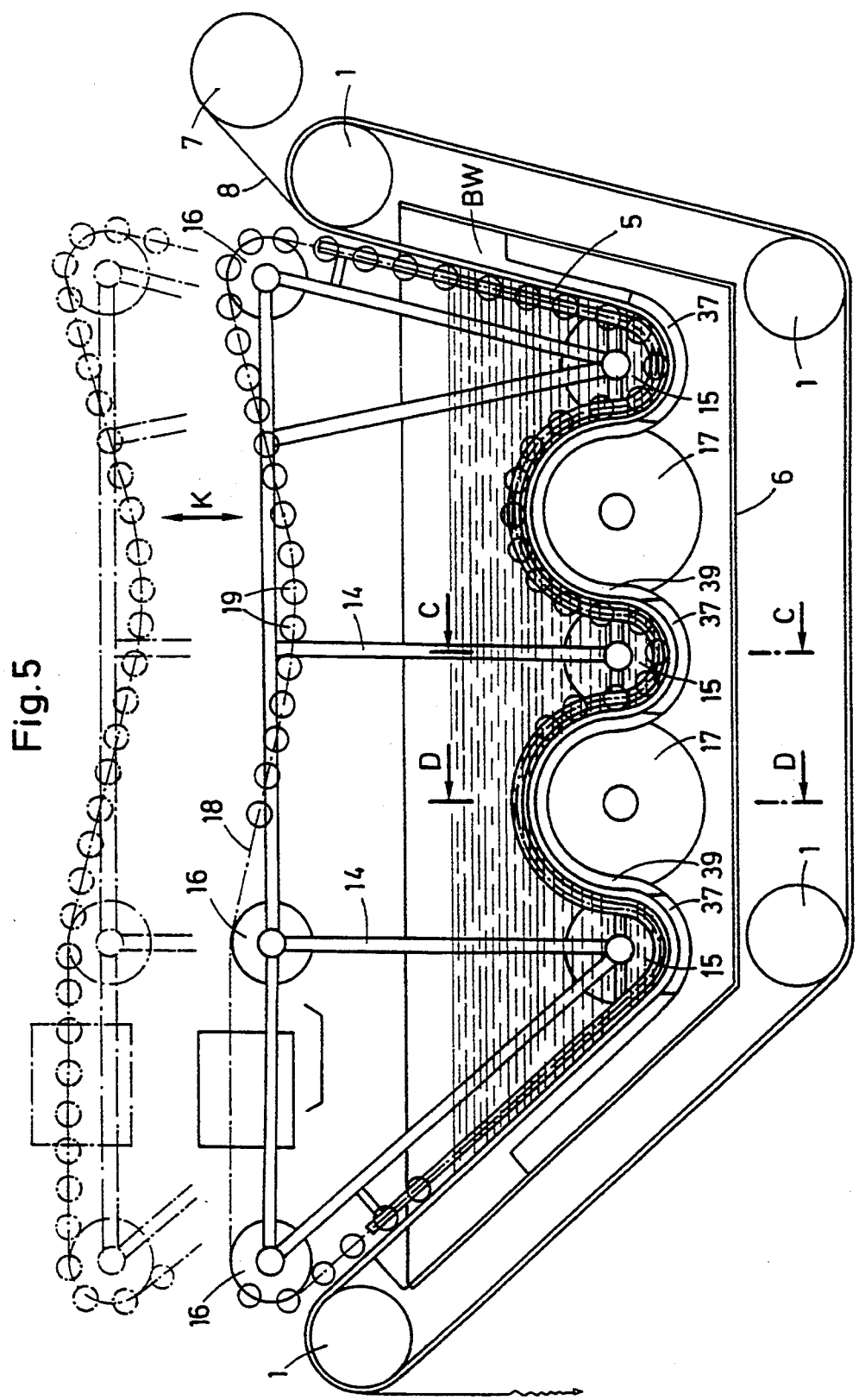

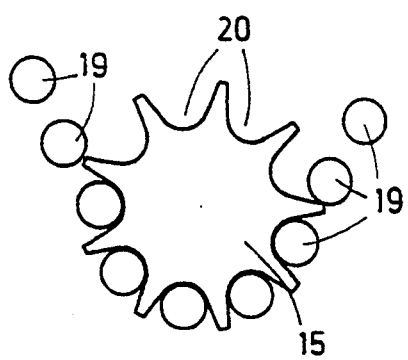
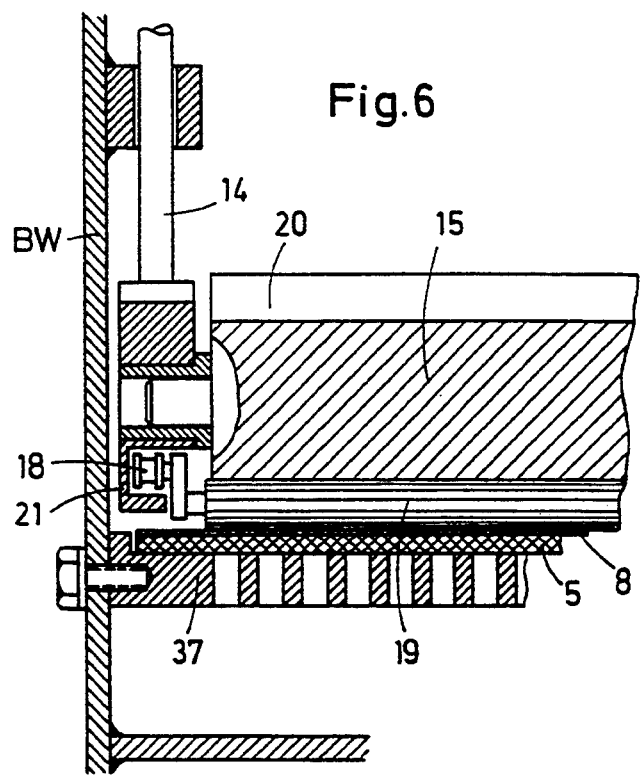
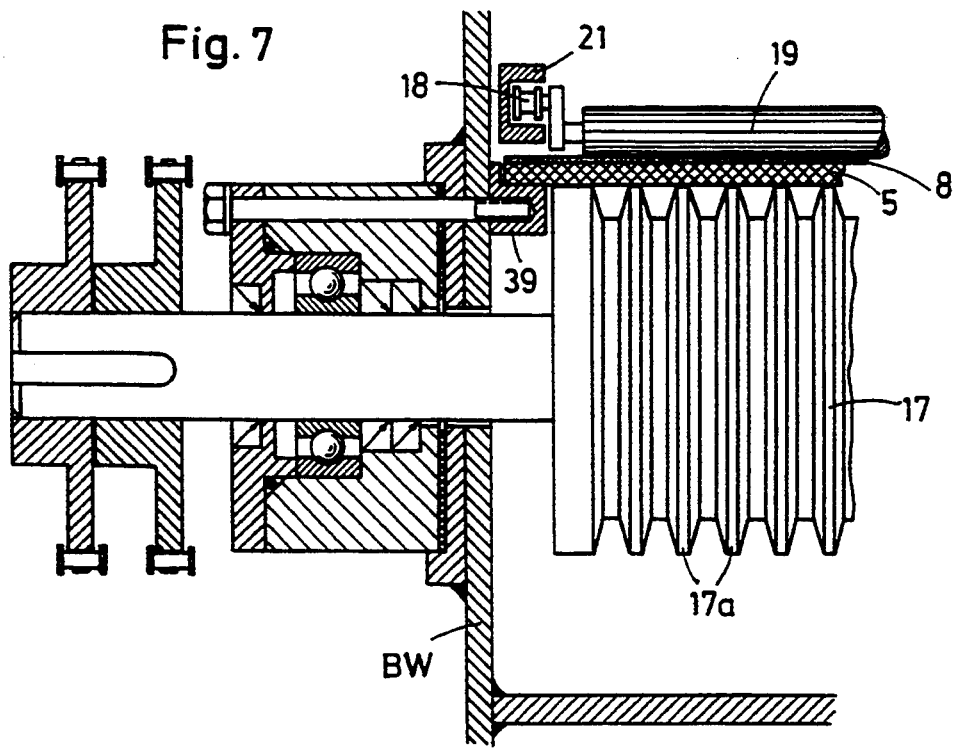

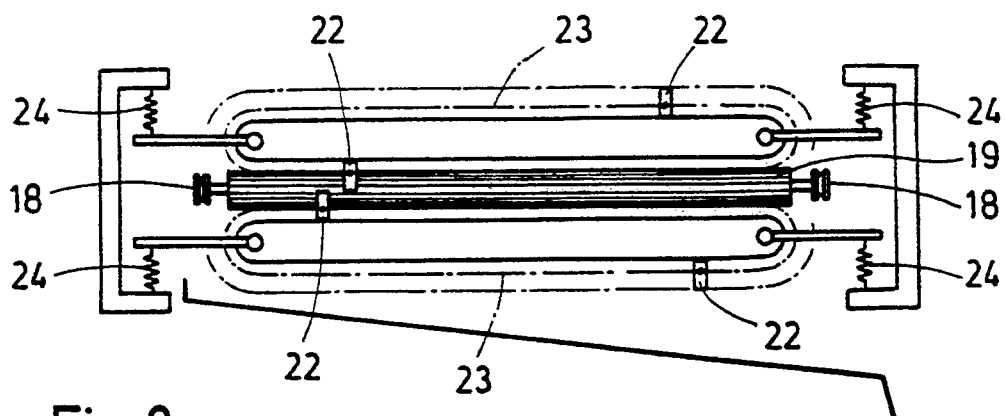
Fig. 9
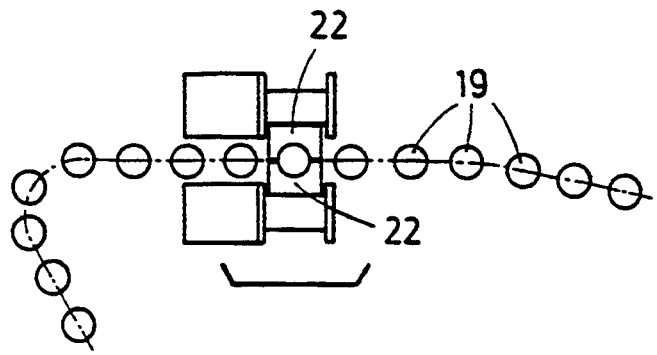
Fig.10
Fig. 11
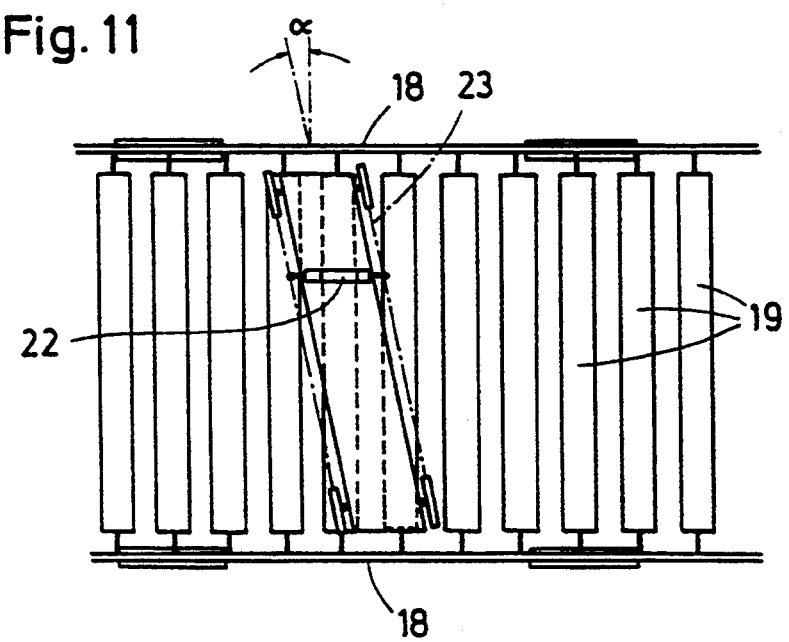

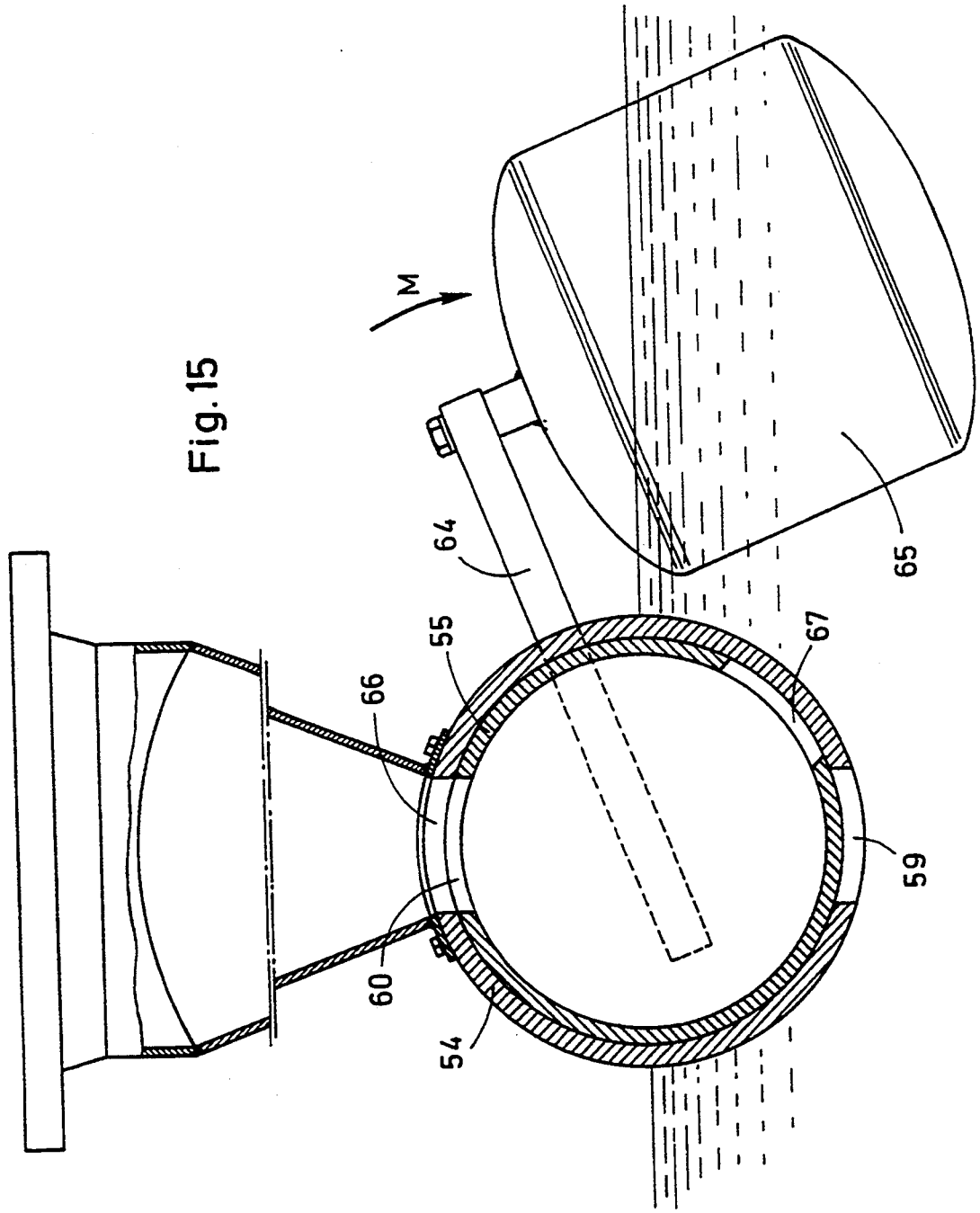

BAND FILTER FOR REMOVING FOREIGN MATERIAL PARTICLES FROM LIQUID BATHS

BACKGROUND OF THE INVENTION

The invention deals with a band-type filter for recovering or removing foreign material particles from liquid baths. A bath tub contains the liquid and guide rollers are arranged in the tub for a filter band introduced from above into the tub bath. The filter band is guided so as to be spaced above the tub bottom, and leaves the tub again from the top. The filter band is configured as a driven endless screening tissue band or as a filter fleece to be unreeled from a roller arranged externally of the tub and resting on an endless driven support belt. A negative pressure chamber receiving the filtered liquid is located below the filter band.

In known band filter installations of this type, the filter band placed upon the perforated bottom plate is respectively pulled forward in steps across the bottom plate for introduction of fresh band segments, after the pressure acting upon the band upper surface produced by the negative pressure in the negative pressure chamber has been removed. With this, the filtering operation is interrupted for as long as needed until fresh band segments have been introduced. Because of this circumstance, on the one hand unpurified liquid flows past the filter, and, on the other hand, the necessity of continuous switching off and on of the filtering process requires considerable resources in terms of apparatus. This start-stop operation entails an additional disadvantage in that directly after the filtering process has been switched off, the filter band lying on the bottom floats or rises towards the top due to the flow reversal in the region of the filter bottom, and also because the filter band tends to float because of its low specific density. This effect is assisted by rising air bubbles. In order to counteract this disadvantage, one has equipped such filters with rods placed transversely to the travel direction of the filter band, which load the filter bands by their weight and thus are meant to prevent the upward floating. During the course of the stepwise pulling forward of the filter band under this load, it is frequently damaged through formation of holes or tears. The rods, because of their weight, increase the friction between the filter band and the base plate, for which reason only special high tensile strength filter bands can be used, which require an increased expenditure.

Therefore, it was already proposed to support the filter band across the base plate on stationary rollers in order to enable a continuous operation. The resting of the filter band upon such rollers however also entails difficulties because the band tends to sag between the rollers and thus no filtering circuit with constant and thus controllable spacing from the pass through-apertures for the filtered fluid in the base plate can be created. Also, the design of the rollers themselves and their arrangement is expensive and requires additional maintenance. It must be added that the side edges of the filter band cannot in actual practice be adequately sealed against the direct passage of unfiltered liquid into the negative pressure chamber and therefore the filtering efficiency of such installations is impaired.

SUMMARY OF THE INVENTION

Accordingly, it is an object of the present invention to eliminate the difficulties of the prior art and to improve filtering efficiency. Pursuant to this object, and others which will become apparent hereafter, one aspect of the present invention resides in placing the faces of the filter band facing the bottom of the tub bath on a plurality of support faces extending transversely to the band guidance direction, and spacing the faces to be parallel next to each other. Also, the contact pressure rollers arranged in the tub bath can be placed upon and removed from the faces facing away from the bottom.

It is achieved by this design, that the filter band rests with the entire filter-effective band segment uniformly over the base construction separating the tub bath space from the negative pressure chamber. Also, the continuous advance conveyance of the filter band is made possible with the application of limited tensile forces with larger filter-effective band segments.

If, as the invention furthermore provides, the contact pressure rollers are arranged in a basket frame, which can be lowered into or lifted out of the bath tub from the top, and if guide rollers and a driven revolving belt slung around the guide rollers are arranged in this basket frame in addition to the contact pressure rollers, then the contact pressure rollers and the guide rollers can be lifted out of the bath tub by means of this basket frame and can be serviced, without the necessity of previously draining the tub bath for this purpose. Furthermore, it is possible herein to replace the set of contact pressure rollers and guide rollers together with the basket frame with another set of equipment.

An additional special advantage results for the operation with a filter fleece placed upon the support belt, since the beginning of the band of the filter fleece can then be pulled into the tub bath with the help of the driven revolving belt and the support belt for the filter fleece band. The filter fleece can then be brought into the effective filtering position and subsequently can again be taken out from the bath tub towards the top. The contact pressure rollers and/or the basket frame are herein expediently designed so that their position can be adjusted and fixed in the lifting or stroking direction.

In a further embodiment of the invention, the support faces can extend across rail-shaped ledges arranged at the bottom of the tub, which ledges form a grate of uncomplicated design or, the support faces can be formed by circumferential annular faces of annular collars of a plurality of support rollers abutted in the tub in a guidance direction and spaced above the bottom of the tub. If these support rollers are used, there results from the invention the possibility of making the contact pressure rollers so as to be introducible into the gap formed in between the support rollers as well as to be able to be pressed against the filter band resting upon the support belt which together with the support belt forms a bridge above said gap as well as forming the circumferential surface segments. With such a construction and arrangement a large effective filtering surface can be housed in a comparatively small bath tub. Since the tensile forces which have to be applied to the support belt of the filter fleece or to the screening tissue band are built up and down again during the guidance around the support rollers and the contact pressure rollers located in between within the pitch of the support rollers, very long and also wide effective filtering surfaces can be achieved within the tub bath.

In still another embodiment, the contact pressure rollers comprise annular collars, whose arrangement and width correspond to the arrangement and width of the parallel support faces, irrespective of whether these parallel support faces are formed by rail-shaped ledges or by annular collars of the support rollers. The support faces can expediently consist of plastic material layers insertable into their carriers. The circumferential surfaces of the support rollers and/or of the contact pressure rollers can comprise perforations that assist the passage of the liquid. The contact pressure rollers can be designed as loosely supported rollers and the support rollers as powered rollers.

In a further embodiment of the invention, the screening tissue band or the support belt of the band fleece consist of a link chain having chain bolts that are connected across the belt width respectively with rows of a plurality of link plates articulated next to each other with a spacing. The planar outer surfaces of the link plates facing the bottom of the bath tub rest upon the support faces. The link plates of each row distributed across the band width are expediently divided into groups of link plates lying tightly packed next to each other and these groups are arranged in a region above respective ones of the support faces. This arrangement achieves a particularly uniform planar placement of the link chain upon the support faces. If the widths of the two groups of link plates lying respectively externally across the width of the link chain are equal to or larger than the widths of the two outer support faces located below them, a particularly effective sealing is created between the bath tub and the negative pressure chamber. With support faces extending on rail-shaped ledges arranged above the bottom of the bath tub, the external link plate groups, acted upon by pressure generated by the negative pressure in the negative pressure chamber, form, together with the support faces, an uninterrupted wide sealing line respectively across the length of the entire travel path of the filter band above the bottom of the bath tub, with a sealing line remaining also in existence during the motion of the filter band.

The integration of the chain link plates of the invention into a screening tissue band or the support belt of a filter fleece permits at least the transmittal of large tensile forces, since these are carried only by the chain link plates, and the screening tissue—or belt surfaces located between the rows of the chain link plates are not subjected to tensile stress, and perform only a support function for the filter fleece. Therefore, in construction they need only to be designed and dimensioned for this function.

Particular advantages in the invention result if a revolving belt of endless support chains connected by consecutive rod members lying transversely to their guidance direction is formed in the basket frame. In the operating mode, with the basket frame lowered into the bath tub, the rod members resting at the top side of the filter band or spaced therefrom revolve at the same or a different speed. The rod members, as is known, consist of a magnetic material, because with this design of the arrangement not only foreign material particles can be removed simply from the liquid bath, but also beforehand ferritic particles before these particles reach the filter band. This beforehand magnetization of the ferritic particles results in an additional synergistic effect consisting in very small ferritic particles coagulating to form a larger particle formation which can still be captured by the filter band, if they have not been deposited at the surface of the rod members consisting of magnetic material. The installation permits the random change of operating modes, either only as a magnetic or only as a fleece filter or both types of filters in combination and this can occur during the continuous operation of the plant.

In yet another embodiment of the invention, the revolving belt and the filter band are selectively driveable either with their drives synchronized or not synchronized, whereby there results the possibility of making the revolving belt with the magnetic rod members revolve at a higher speed than the speed of the filter band, for instance in order to increase the precipitation output of ferritic particles.

The revolving belt is, according to an additional embodiment of the invention expediently guided in the region of its passage around the contact pressure rollers and the support rollers in guide blocks arranged on their sides to be stationary in the support frame. Also driver recesses extending parallel to the roller axis and adapted to the cross-section of the rod members can be arranged at the circumference of the contact pressure rollers.

For the continuous operation of the revolving belt with rod members consisting of magnetic material, ferritic particles adhering to the circumferential surfaces of the rod members can be removed from the circumferential surface with the help of arrangements, known as such, consisting of scrape-off sections displaceable across the rod length and embracing the rod cross-section from two sides. These scrape-off or scraper sections are designed so that they are arranged respectively on two or more adjacent pairs of revolving transport arrangements arranged above and below the section rod, and pressable elastically against the transport arrangements. The conveyance direction of the pairs of conveyance arrangements extends at an angle with respect to the direction of motion of the support chains, which angle is dimensioned in such a way that with appropriately matched to each other movements of the revolving belt and the revolving conveyance arrangement the time span of one wipe-off movement of the pairs of scraper sections of the first revolving conveyance arrangement across the length of the rod corresponds to the time span within which the rod section was moved forward beneath this first revolving conveyance arrangement. The corresponding wipe-off movement of the pairs of scraper sections of the next revolving conveyance arrangement follows directly thereon with a correspondingly equal time span.

The band filters designed in accordance with the invention require maintaining the level of the bath liquid as constant as possible, independently of which larger or smaller quantities of untreated liquid are supplied to the bath tub, because continuous filtering operation when using a centrifugal pump assumes a corresponding continuous draw-off of bath liquid in constant quantities. Therefore, the invention provides additionally, to maintain the level of the liquid in the bath tub essentially constant in spite of changing quantities of the flow-in of bath liquid and the constant quantity of the drawn-off bath liquid, in that a steplessly adjustable flow divider is arranged in a flow-out direction downstream of the circulation pump. The flow divider directs one portion of the overall quantity of the draining treated liquid back into the tub, and the other portion or the entire quantity of the bath liquid away from the tub, this occurs as a function of the level of the bath liquid in the tub. The arrangement of this flow divider leads to the flow-out of the treated valve liquid being on the one hand throttled and, on the other hand, the return flow of the bath liquid into the bath tub can occur entirely or partially. With the falling level of bath liquid, more liquid can expediently be diverted into the tub and less of the treated bath liquid can be directed into the downstream storage containers.

The flow divider, pursuant to the invention, consists of a slide piston which can move vertically up and down in a cylinder, which is connected by a guide lever rod with a float floating in the tub liquid. The slider piston comprises a central supply recess and two outlet recesses offset axially against each other and branching off radially from the supply recess. Outlet recesses in the cylinder are associated with the above piston recesses and are arranged in a common radial plane in the cylinder. The flow divider can also consist of cylinder tubes rotatable against each other, telescoped inside one another and arranged to be axially concentric to each other. The external one of the cylinder tubes is stationary and comprises axially parallel outlet recesses. The inner cylinder tube is rotatably supported, comprising corresponding outlet recesses which are also axially parallel associated with outlet recesses of the external tube as well as comprising an inlet aperture at one end face, and at the other closed end face is connected with a single arm lever carrying the float.

The arrangement of apparatus equipped with features described above permit the revolving belts with the section rod to revolve continuously as well as to scrape off and remove, also continuously during the revolutions, the ferritic particles adhering to the surface of the rod members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4 is a detail along section B—B in FIG. 2, at a magnified scale;

FIG. 5 is another embodiment of the band filter with tub, in vertical section viewed from the side;

FIG. 6 is a section along the line C—C in FIG. 5, at a magnified scale;

FIG. 7 is a section along the line D—D FIG. 5, at a magnified scale;

FIG. 8 is a detail of the side view in FIG. 6, shown diagrammatically;

FIG. 9 is an additional embodiment viewed from the side, shown diagrammatically;

FIG. 10 is a side view of FIG. 9, also shown diagrammatically;

FIG. 11 is a plan view of FIG. 9, shown diagrammatically;

FIG. 15 is a section along the line E—E in FIG. 13.

DETAILED DESCRIPTION OF THE PREFERRED EMBODIMENTS

Figure 1:
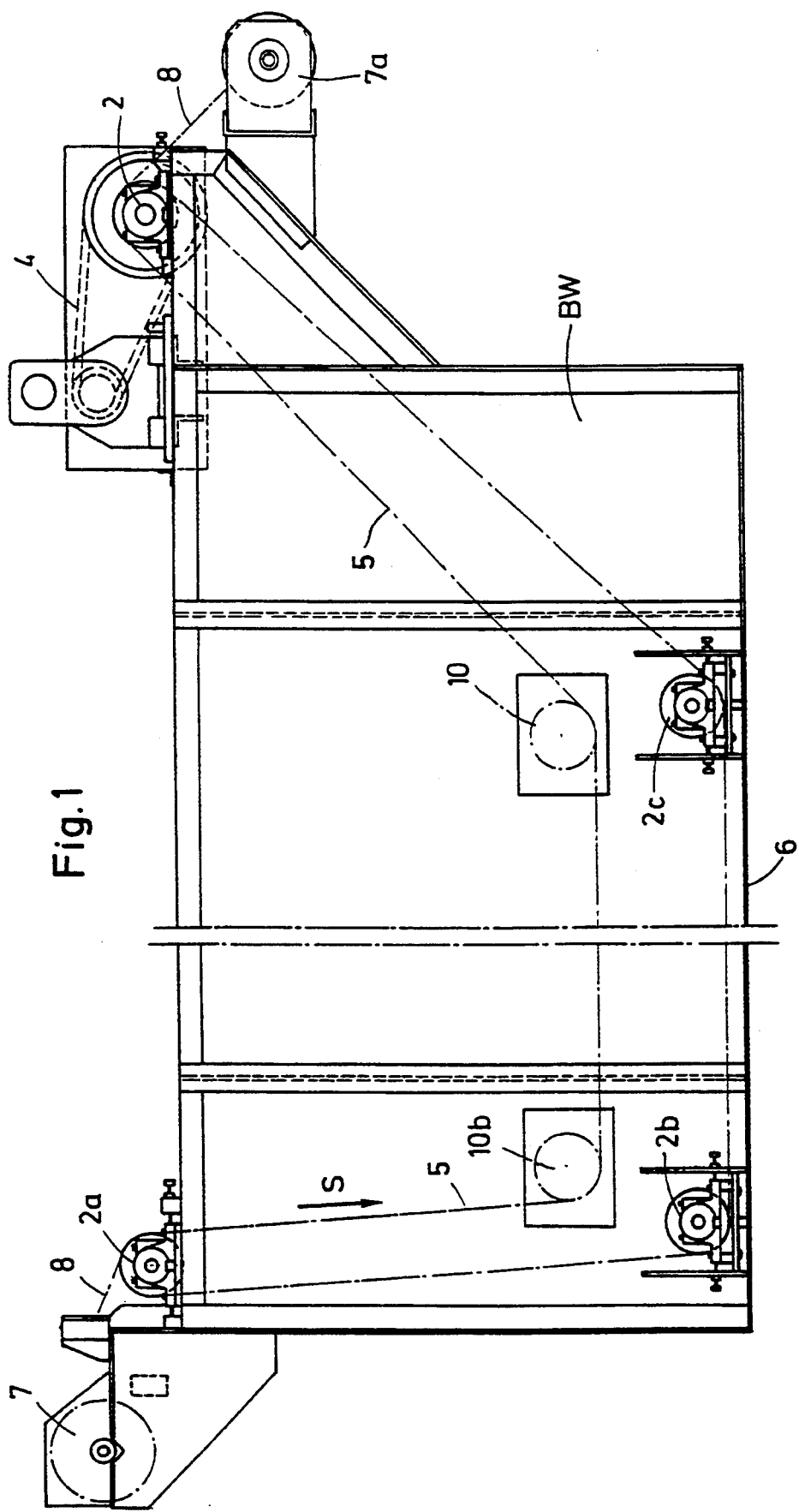
FIG. 1 is a first embodiment of a bath tub in a vertical section viewed from the side.
Figure 2:
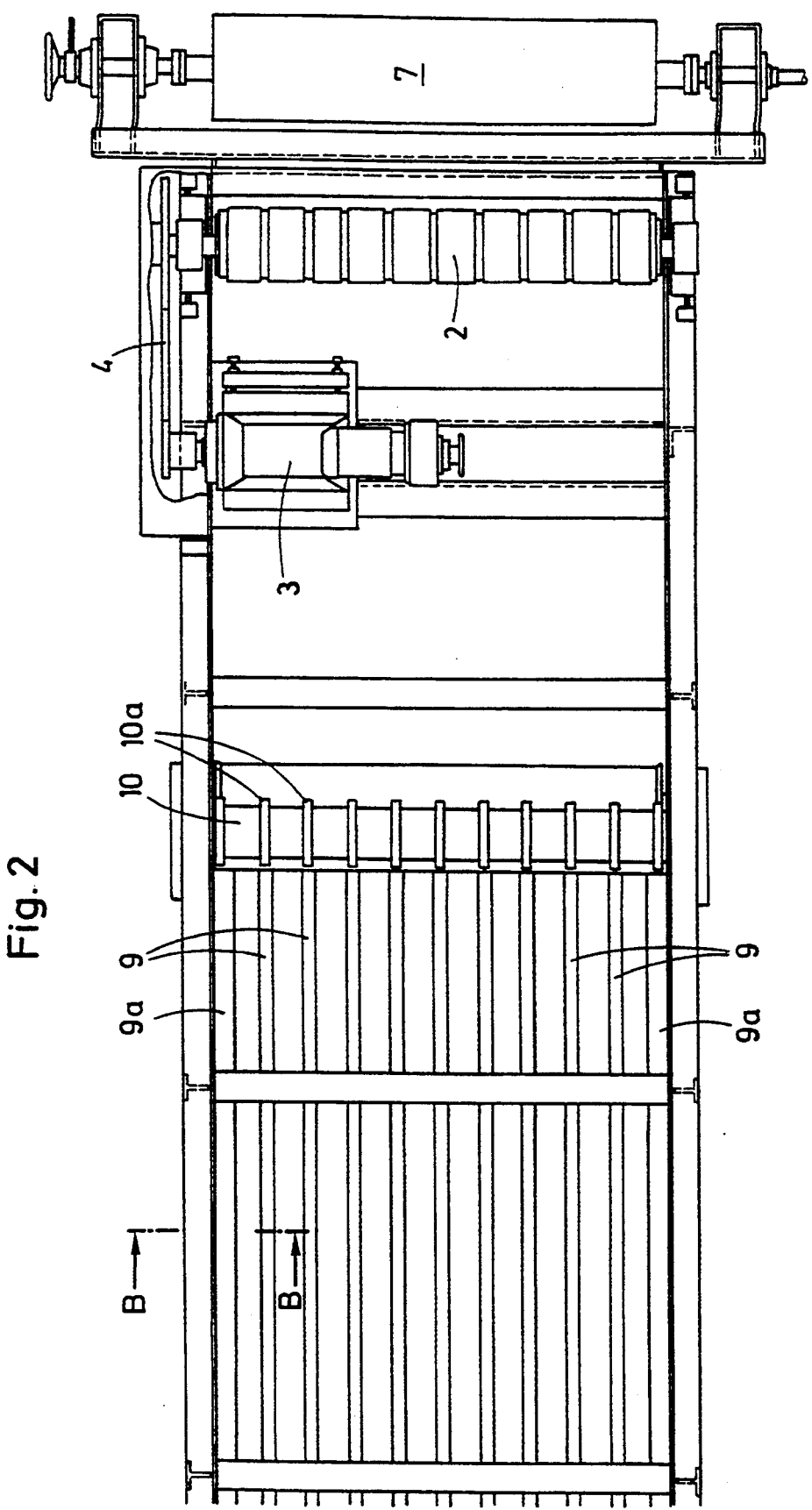
FIG. 2 is a plan view of FIG. 1.
Figure 3:
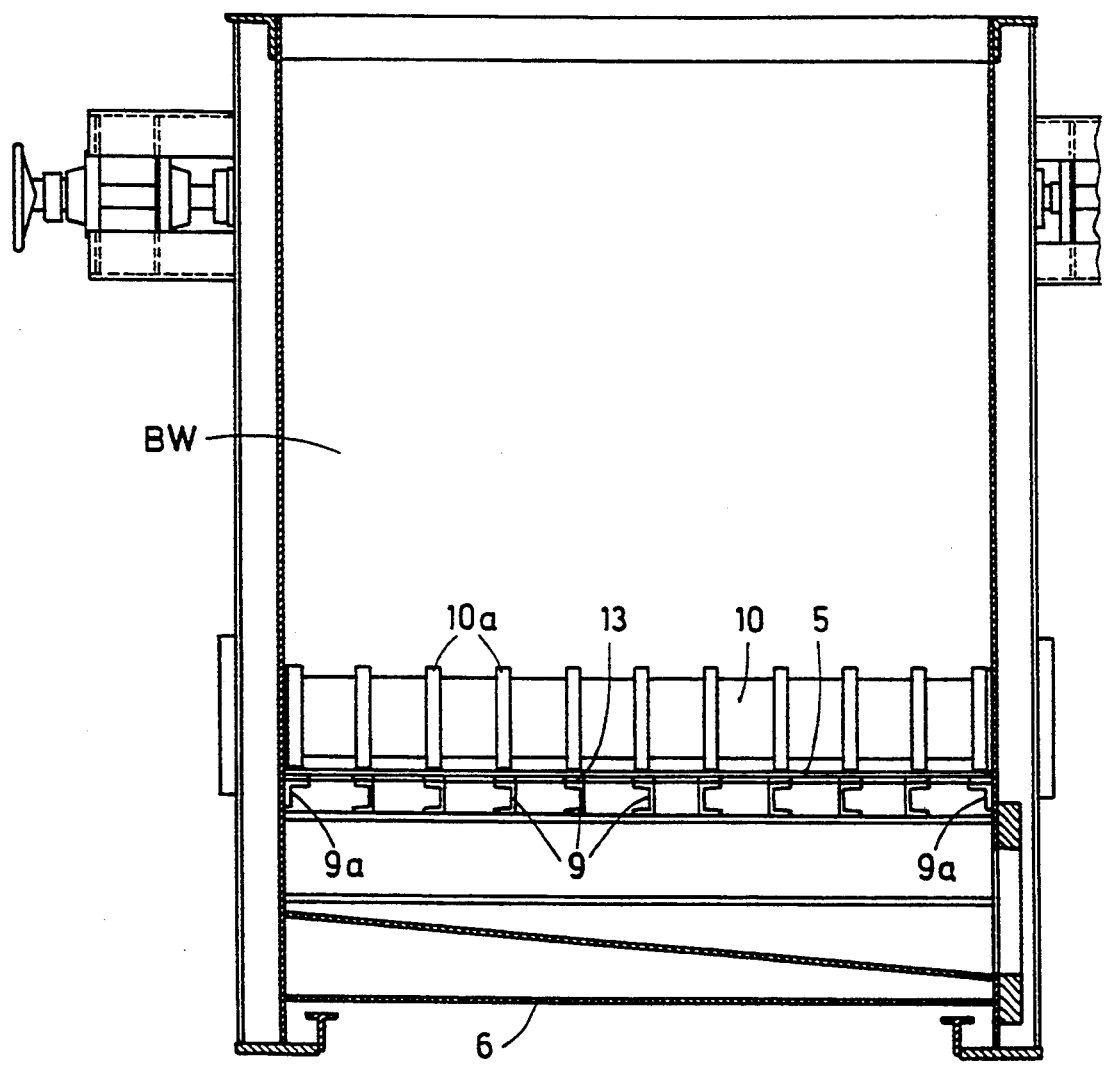
FIG. 3 is a section along the line A—A in FIG. 1.

As can be seen in FIGS. 1, 2 and 3, guide rollers 2, 10, 10b, 2a, 2b, 2c are arranged in a bath tub BW containing the liquid bath. The guide roller 2 constitutes a powered roller driven by a motor 3 through a reduction gear 4. The remaining guide rollers 10, 10b, 2a, 2c and 2c guide an endless filter band 5 outlined in broken dotted lines, which in this case is designed as a support belt, from the guide roller 2a in the direction of the arrow S obliquely downward into the tub BW. Those guide rollers also direct the belt into a horizontal plane above the bottom 6 of the tub BW and subsequently bring it upwardly out of the tub BW to the guide roller 2 constituting the powered roller. A filter fleece 8 reeled off a roller located at the end face of the tub BW is deposited upon the support belt and forms together with the belt the filter band 5. The filter band 5 lies (FIG. 3) upon support faces extending next to each other and parallel to each other in a direction common with the band guidance direction outlined by the arrows. The support faces in this case are formed by rail-shaped ledges 9 arranged above the bottom 6 of the tub BW (FIG. 2 and FIG. 3). Contact pressure rollers 10, 10b can be placed upon the filter band 5 in the area of these ledges 9, which rollers in this case (FIGS. 2 and 3) comprise annular collars 10a whose layout widths corresponds to the widths of the support faces formed by the rail-shaped ledges 9. The expended filter fleece 8, after it has been lifted out the tub BW, is raised from the support and coiled upon a roller 7a.

The support belt, on which the filter fleece 8 is placed, consists in this case (FIG. 4) of a link chain, to whose chain bolts 11 rows of a plurality of chain link plates 12 are respectively articulated to be spaced next to each other across the width of the belt. This row of chain link plates 12 forms planar outer faces, which rest upon the support faces, in this case the rail-shaped ledges, and indeed in such a way, that each row forms groups of chain link blades 12 lying closely next to each other. These groups are arranged in the region above the respective support faces formed by the rail-shaped ledges 9. As can be further seen in FIG. 4, the width of the two groups of chain link plates located respectively externally across the width of the link chain equals or is here greater than the width of the support faces formed by the rail-shaped ledges 9a, which support faces are located below the groups of chain plates. This arrangement results in particularly effective sealing of the space of the tub BW located above the filter band formed by the link chain and the band fleece 8 against the space (compare FIG. 3) forming a negative pressure chamber located directly beneath.

Plastic material layers 13, which improve the sliding properties of the support faces, are placed upon the rail-shaped ledges 9 (FIG. 4).

The filter band 5 formed by the thus configured link chain 11, 12 and the filter fleece 8 is, as can be seen especially in the presentation in FIG. 4, guided as a planar non-sagging filter surface above the bottom 6 of the tub BW and the filter fleece 8 cannot float towards the top during this guidance for instance when the negative pressure is switched off, since the contact pressure rollers 10 will prevent this with their annular collars 10a.

In the embodiment shown in FIG. 5, guide rollers 16 and special contact pressure rollers 15 are arranged in a basket frame 14 which can be lifted out from the shown position in the tub BW in the direction of the twin arrow K for instance into the position shown in broken dotted lines and can be lowered back again into the tub BW. The respective positioning of the basket frame 14 is adjustable and fixable in a manner not shown here. An appropriately designed basket frame, which carries only contact pressure rollers, or also guide rollers, and a drivable revolving belt revolving around the above rollers can also be utilized for the already described design in FIGS. 1-4, wherein in this case the contact pressure rollers 10 shown there are not necessary. Support rollers 17 are supported in the embodiment of FIG. 5 above the bottom 6 of the tub BW and in the guidance direction of the filter band 5. The contact pressure rollers 15 supported in the basket frame 14 can be brought into the spaced gaps formed in between these support rollers 17 when the basket frame 14 is lowered so as to press the filter band 5 against the circumferential surface segments of the support rollers 17 forming the respective gap.

The revolving belt guided around the guide rollers 16 and the contact pressure rollers 15 consists in this embodiment of two endless support chains 18, connected with consecutive rod members 19 oriented transversely to their guide direction, which in the shown position of the basket frame 14 in the tub BW rest at the upper side of the filter band 5. This filter band 5 is conveyed through the tub BW by guide rollers 1, as has already been explained, and the associated filter fleece 8 is taken off a roller 7 and placed into position exactly as in the embodiment explained previously. The contact pressure rollers 15 or the guide rollers 16 have at their circumference driver recesses 20 extending parallel to the roller axis as can be seen in FIGS. 6 and 8, which recesses are adapted to the cross-section of the rod members 19. The endless support chains 18 are herein guided inside guide blocks 21 in the region of their contact with the contact pressure rollers 15 and the support rollers 17 in a manner discernible from FIGS. 6 and 7, with the guide blocks 21 arranged rigidly in the basket frame 14.

The support rollers 17 comprise annular collars 17a whose circumferential annular faces form, together with annular supports 39 arranged in the tub BW, backup or support faces for the central region and the sides of the filter band 5. In the area below the contact pressure rollers 15, the filter band also rests on partially cylindrical support shells 37 connected with the tub BW (FIGS. 6 and 7).

The magnetic rod members 19 connected with the endless support chains 18 are embraced by scraper sections 22 embracing the rod cross-section from two sides. This occurs after the endless support chains 18 have exited the liquid bath in the tub BW and have been returned to the area above the liquid level. The scraper sections 22 are displaceable across the length of the rod parallel thereto and hereby they remove ferritic particles adhering to the circumferential surface of the rod members. These scraper sections are respectively arranged on, in this case, two adjacent pairs of revolving conveyance arrangements, here band guides 23, which, being elastically suspended on springs 24, can be pressed against the section rods 19. The motions of the scraper sections 22 generated by the band guides 23 are arranged at an angle $\alpha$ (FIG. 11) with respect to the direction of motion of the endless support chains 18 carrying the rod members 19. This angle $\alpha$ is sized so that, with appropriately matched to each other movements of the endless support chains 18 and the band guide 23, the time span of one wipe-off movement of the scraper sections 22 of the first band guide 23 across the length of the section rod 19 viewed in the direction of motion of the endless support chains 18 corresponds to the time span within which the section rod 19 is moved ahead under this first band guide 23. The corresponding wipe-off motion of the scraper sections 22 of the next band guide 23 can then follow at the same corresponding time span with the wipe-off motion across the following section rod 19. Thereupon a third wipe-off motion follows in the same manner upon the second wipe-off motion, which again is performed by the scrape off section of the first band guide 23.

Figure 12:
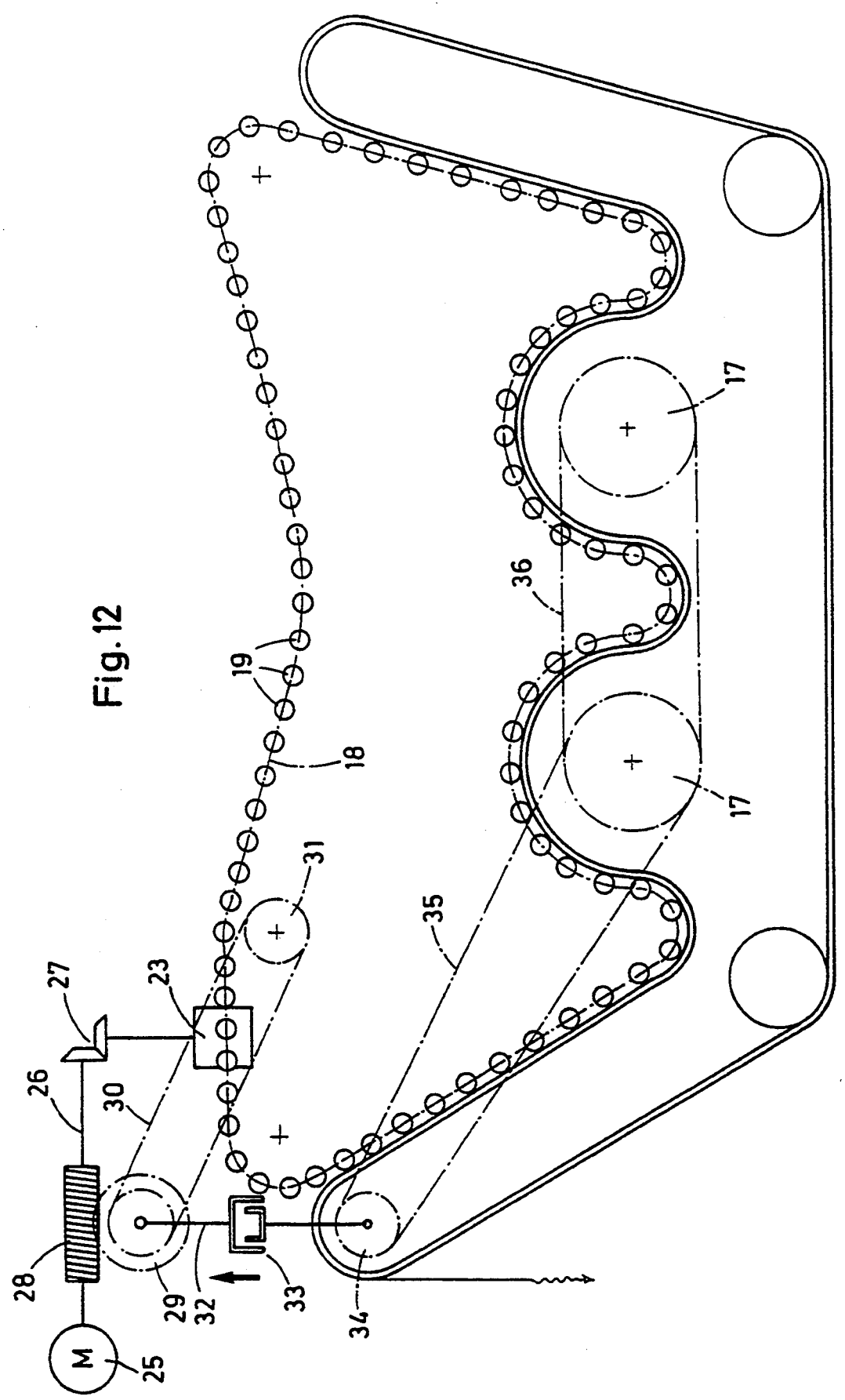
FIG. 12 is a drive diagram, also shown diagrammatically.

As can be seen from the power flow driving diagram in FIG. 12, a reversible motor 25 drives the band guide 23 for the scrape-off sections 22, not shown here, through a shaft 26 and an angle drive 27. A worm 28 sits on the shaft 26 and meshes with a worm wheel 29, through which, together with a chain drive 30, 31, the endless support chains 18 with the rod members 19 are driven. The drive wheel 34 can be engaged with and disengaged from the shaft 32 of the worm wheel 29 by a clutch 33. The drive wheel drives the support rollers 17 and with them the filter band 5, not shown, via chains 35, 36. The transmission ratio between the worm 28 and the worm wheel 29 determines the ratio or relationship between the motion of the scraper sections 22 across the rod members 19 and the motion of these rod members 19 in the guidance direction of the endless support chains 18 (compare FIG. 11), while the clutch 33 between the worm wheel 29 and the sprocket wheels 34 assures the synchronous travel of the endless support chains 18 and the filter band 5.

In the position shown in FIG. 5, the filter fleece 8 is pulled from the roller 7 by means of the section rods 19 revolving together with the endless support chains 18 into the tub BW, conducted around the contact pressure rollers 15 and the support roller 17 and again brought out of the tub BW towards the stops. This operational position is suitable for liquids containing a comparatively small share of ferritic particles. If, however, the share of such particles exceeds the non-ferritic particles, which are directly retained in the filter fleece, then the basket frame 14 can be raised and the endless support chain 18 can be driven at a higher speed than the filter band 5, this with the clutch 33 disengaged. This operation mode extensively avoids the feared blockage of the filter fleece, for instance, by liquids loaded with extraneous oil. Such extraneous oils and ferritic particles as a rule combine solidly with each other and therefore adhere together at the rod members 19. Tests have shown that the share of ferritic particles in the sludge wiped away from the rod members 19 amount to only 2 to 10%, while the rest is composed of extraneous oils and other contaminants.

The contaminated filter fleece 8 is removed from the tub BW through the reversing roller 1 and is either directly deposited into not shown containers or is reeled up into bales to be disposed in a manner which is also not shown here.

For applications where no ferritic particles are encountered, the rod members 19 can also consist of non-magnetic materials, and the arrangement with the scraper sections 22 is not required.

Figure 13:
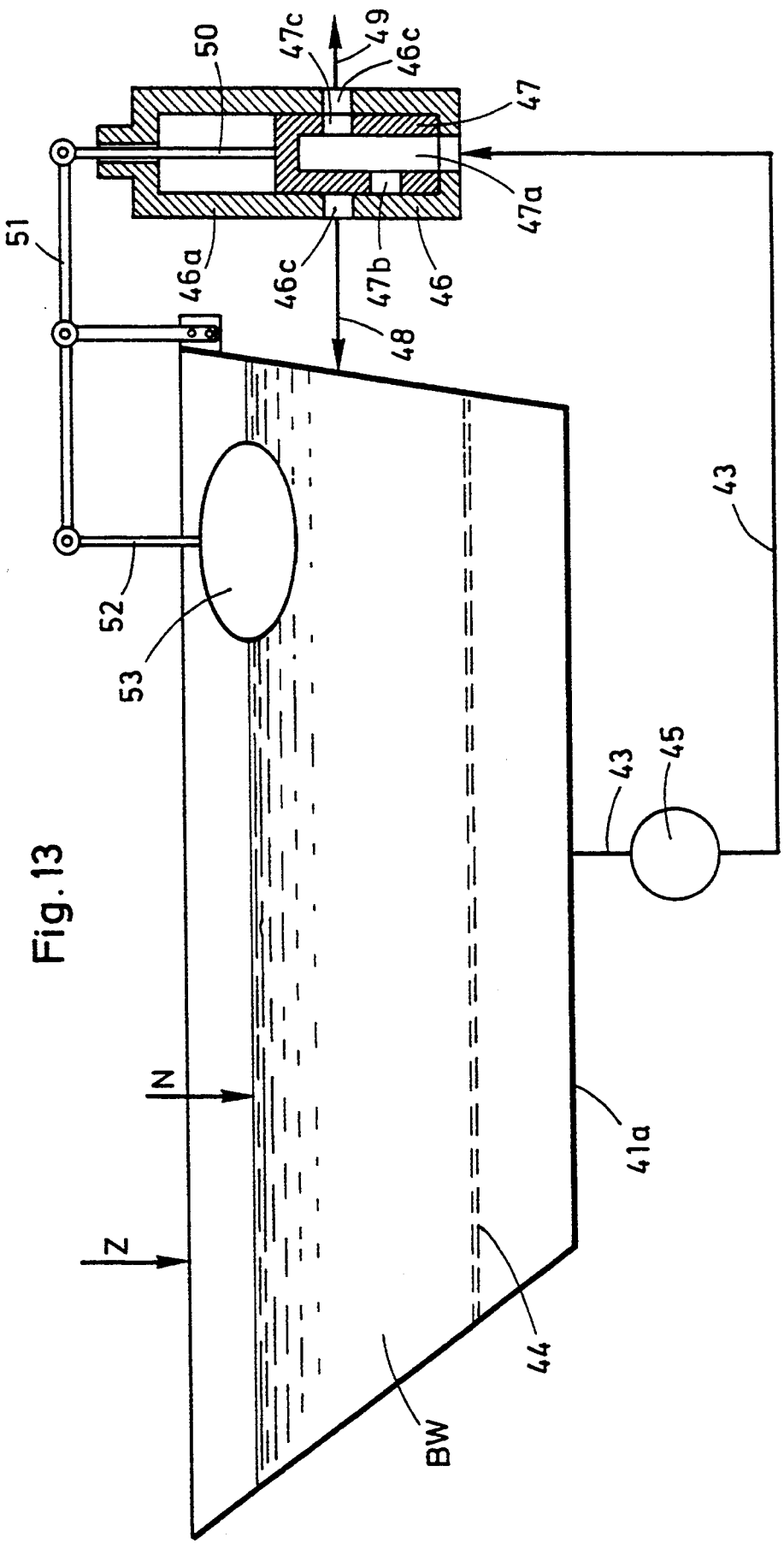
FIG. 13 is an embodiment of and the arrangement of a flow divider, shown diagrammatically.

As is seen from FIG. 13, the supply line for the untreated bath liquid into the tub BW is outlined by an arrow Z. The outlet line 43 in the bottom 41a of the tub BW is located beneath a filter 44 shown diagrammatically by a broken double line. The outlet line 43 leads through a circulation pump 45 into a flow divider 46. The flow divider 46 consists of a vertical cylinder 46a with a slider piston 47 guided therein so as to be able to move up and down. The slider piston 47 comprises a central supply or feed recess 47a and two outlet recesses 47b, 47c which branch off outwardly and radially from the supply recess 47a and are arranged to be axially offset against each other. These two outlet recesses 47b and 47c are respectively associated with outlet recesses 46b and 46c, of which the outlet recesses 46b leads back into the tub BW through a line 48 and the outlet recess 46c leads through a line 49 into a downstream storage container not shown here. The slide piston 47 is connected with a float 53 through a piston rod 50 and a lever linkage 51, 52, with the float floating on the bath liquid, whose level is indicated by N.

In the position of slider piston 47 and float 53 shown in FIG. 13, the entire quantity of treated bath liquid removed by the circulation pump 45 through the outlet line 43 into the central supply recess 47a is drawn off through the outlet recesses 47c and 46c aligned with each other and carried away through the line 49. If the level N of the bath liquid falls, then the float 53 also moves downwards and causes lifting of the piston rod 50 together with the slider piston 47 through the lever linkage 51, 52. This entails that the drainage of the bath liquid is reduced through the outlet recesses 46c, 47c now displaced against each other and correspondingly a return flow of a portion of the bath liquid is caused through the outlet recesses 47b, 46b and through the line 48 back into the tub BW.

Figure 14:
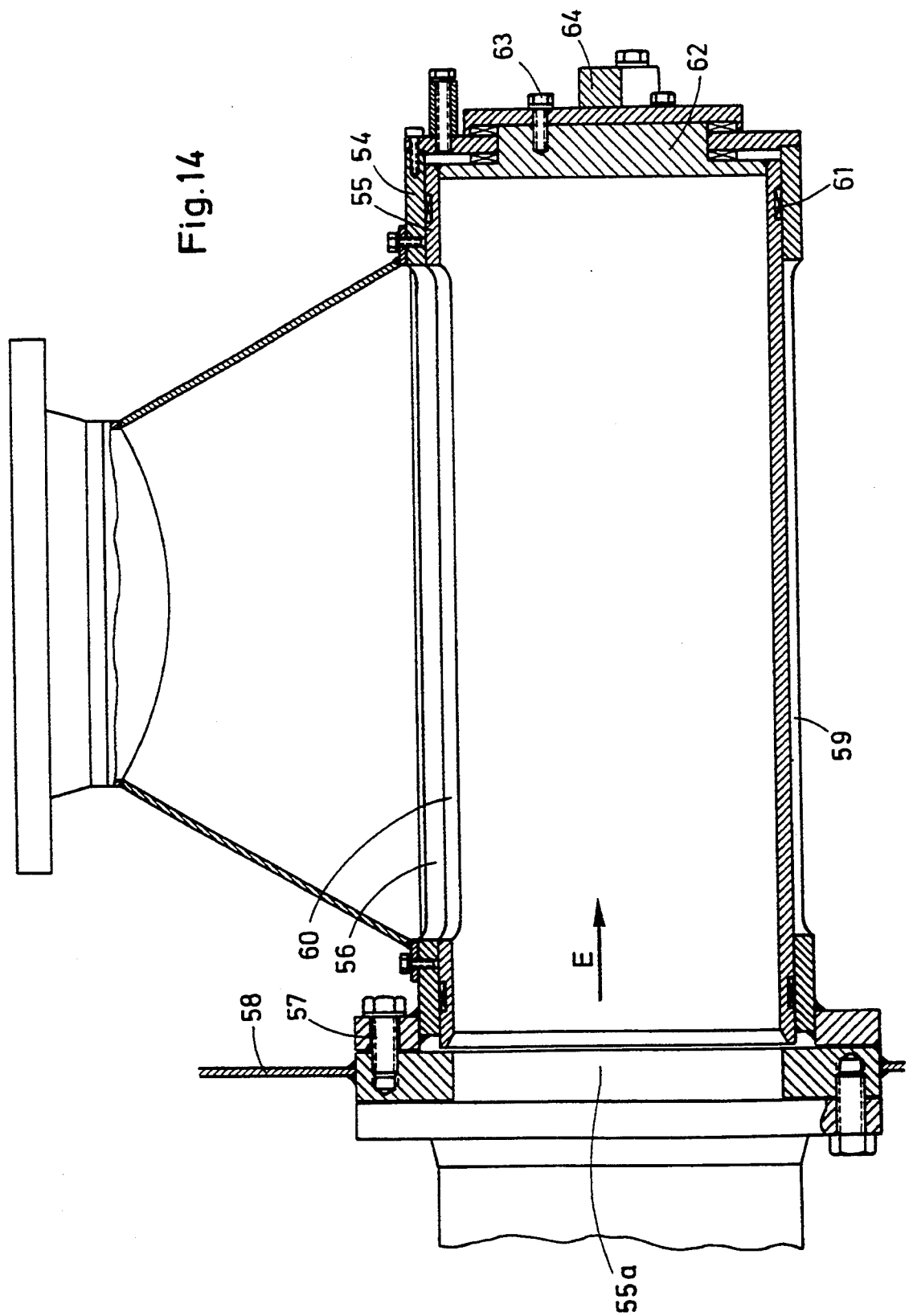
FIG. 14 is another embodiment of the flow divider in FIG. 13, in axial section.

The flow divider shown in FIGS. 14 and 15 is formed by two cylindrical pipes 54 and 55 which rest against each other with their inner and outer surfaces and are telescoped inside each other in an axially concentric manner. The outer cylinder pipe 54 is rigidly connected with a flange support ring 56, which on its part is fastened by screws 57 to a stationary support frame 58, for instance at that of the tub BW. Axially parallel slotted outlet recesses 59 or 60 located opposite each other are arranged in the lower and upper region in the wall of the outer cylinder pipe 54. The lower recess 59 discharges into the tub BW which is not shown, while the upper recess 60 is connected to the storage container also through lines not shown here, which however correspond to the line 49 in the embodiment in FIG. 13. The inner cylinder pipe 55 is rotationally supported by bearing rollers 61 in the outer cylinder pipe 54, and comprises an inner aperture 55a at its one end face, into which discharges the line 43 originating from the circulation pump not shown here but corresponding to the circulation pump 45 in FIG. 13. The other side of the inner cylindrical pipe 55 is closed off by a disk 62. A single arm lever 64 fastened by screws 63 sits on this disk 62, which lever carries a float 65 at its free end. Two axially parallel outlet recesses 66 or 67 are also arranged in the wall of the inner cylinder pipe. Of these, the outlet recesses 66 are associated with the outlet recess 60 and the outlet recess 67 with the outlet recess 59 of the outer cylinder pipe 54.

In the rotational position of the inner cylinder pipe 55 with respect to the outer cylinder pipe 54 shown in FIGS. 14 and 15, the bath liquid stream entering into the inlet aperture 55a in direction of the arrow E and coming from the outlet line 43 is directed in an undivided manner through the slotted outlet recesses 66 and 60 aligned with each other to the storage container, which is also not shown here, since the float 65 (FIG. 15) is in its position defined by the letter N of the bath liquid. If the float 65 moves downward in direction of the arrow E shown in FIG. 15 when the liquid level N falls, then the quantity of the bath liquid flowing through the outlet recesses 66, 60 to the storage container is reduced due to the displacement of the slotted outlet recesses 66, 60 and 67, 59 against each other and the possibility of the return flow of the corresponding quantity share of bath liquid into the tub BW is created through the slotted outlet recesses 67, 59.

The apparatus operates as follows: The circulation pump 45 (FIG. 13) sucks the liquid from the space beneath the filter band 5, which liquid passes through the filter band and generates a negative pressure in this space. The differential pressure, produced because of the higher pressure in the space above the filter band 5, results, when it has attained a predetermined maximum value, in the necessity to move contaminated lengths of the filter band 5 out of the filter effective position and to move in the following uncontaminated length into this position. Since the surface of the support roller 17 embraced by the filter band 5 is larger than that of the contact pressure rollers 15 arranged in between, the filter band 5 is conveyed further in spite of the contact pressure, acting thereon caused by the differential pressure, assuming an approximately equal friction coefficient of both rollers.

While the invention has been illustrated and described as embodied in a band filter for removing foreign material particles from liquid baths, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A band filter apparatus for removing foreign particles from a liquid bath, said apparatus comprising:
   a tub for holding the liquid bath;
   a filter fleece unreelably mounted to a roll and having a portion located in said tub;
   an endless support belt for supporting said filter fleece portion which is located in said tub, said filter fleece being placed directly upon said support belt inside said tub and forms together with the support belt a filter band;
   means defining a negative pressure chamber disposed in said tub below said filter band and having a top with an aperture formed therein facing said filter band, means for producing a negative pressure in said negative pressure chamber;
   means comprising a plurality of guide rollers extending substantially across the entire width of said filter band for supporting and guiding said support belt in said tub, said guide rollers being located on the support belt side of the filter band and being arranged so that the support belt together with the filter fleece travels from a top of a first end of said tub there into, above said aperture in said negative pressure chamber and upwards and out of a second end of said tub, said guide rollers further guiding the support belt downwardly beneath said negative pressure chamber in spaced relationship to a bottom of said negative pressure chamber and again upwards to a first end of said tub;

means for driving at least one of said plurality of guide rollers;

a plurality of spaced slide surfaces arranged above said aperture in said negative pressure chamber and below the filter band for supporting said filter band when said filter band travels above said aperture;

means comprising band contact pressure rollers located in said tub on top of said filter band on the filter fleece side thereof for holding the filter band down upon said plurality of spaced slide surfaces, said band contact pressure rollers being connected together to form a bucket-shaped frame, means for vertically moving said bucket-shaped frame containing said contact pressure rollers vertically away from the filter band and back to on top of the filter band.

2. The band filter apparatus of claim 1, wherein said plurality of slide surfaces is formed by cylindrical surfaces of annular collars of a plurality of spaced support rollers, said contact pressure rollers being movable into gaps formed between adjacent support rollers and being pressed against portions of said filter band resting on circumferential surface segments of the adjacent support rollers.

3. The band filter apparatus of claim 1, wherein said support belt comprises a link chain including a plurality of chain pins and rows of spaced chain plates supported on said chain pins, said spaced slide surface comprising support surfaces arranged above the top of said negative pressure chamber for supporting said link chain thereabove.

4. The band filter apparatus of claim 2, further comprising a revolving belt extending between said contact pressure rollers in said basket-shaped carrying frame, and including a plurality of rod members extending transversely to a direction of displacement of said revolving belt, said rod members engaging said filter band, in a lowered position of said basket-shaped frame, when the displacement direction of said revolving belt coincides with the travel direction of said filter band in said tub.

5. A band filter apparatus of claim 4, wherein said rod members are formed of a magnetic material.

6. The band filter apparatus of claim 4, further comprising stationary guide blocks arranged in said basket-shaped frame for guiding said revolving belt at least in a region of its displacement around said contact pressure rollers and said support rollers.

7. A band filter apparatus of claim 6, wherein said contact pressure rollers comprise on a circumference thereof, a plurality of driver recesses extending parallel to the axes of respective contact pressure rollers and having a cross-section corresponding to a cross-section of said rod members.

8. A band filter apparatus of claim 2, further comprising annular supports and cylindrical shells for supporting said side regions of said filter band in regions of said support rollers and for supporting said filter band in regions thereof beneath said contact pressure rollers, respectively, said annular supports and said cylindrical shells being connected with said tub.

9. The filter band apparatus of claim 5, further comprising a plurality of scraper sections embracing said rod members from two sides and displaceable along a length of said rod members for removing ferritic particles adhering to circumferential surfaces of said rod members, wherein said scraper sections are arranged on at least two adjacent pairs of revolving conveyance arrangements arranged above and below of said rod members and elastically engaging said rod members;

wherein said filter apparatus further comprises means for displacing said scraper sections at an angle to the displacement direction of the revolving belt, said angle being so selected that a time span between a beginning and an end of a wipe-off motion of the scraper sections, carried by a first of said pair of revolving conveyance arrangement, corresponds to a time span during which a respective rod member is displaced beneath said first of said pair of revolving conveyance arrangements, with a corresponding wipe-off motion of scraper section carried by a second of said pair of revolving conveyance arrangement being effected with a same time span.

10. The filter band apparatus of claim 1, further comprising a pump for delivering liquid from said tub and a steplessly adjustable flow divider, arranged downstream of said pump for controlling a level of fluid in said tub, said flow divider comprising means for returning a portion of the fluid delivered from said tub back into said tub as a function with an actual level of liquid in said tub.

11. The filter band apparatus of claim 10, wherein said apparatus comprises a float located in said tub, and wherein said flow divider comprises a vertical cylinder, a slider piston displaceable in said cylinder, and lever means for connecting said piston with said float, said piston having a central inlet opening communicating with said pump, two outlet openings, offset relative to each other, arranged radially with respect to said central inlet opening, and said cylinder comprising two outlet recesses arranged in a common radial plane and alternatively communicating with said two outlet openings in said piston, respectively.

12. The filter band apparatus of claim 10, wherein said flow divider comprises coaxial outer and inner cylindrical pipes telescopically displaceable relative to each other, wherein the outer cylindrical pipe is stationary and has slotted outlet recesses extending parallel to an axis of said flow divider, wherein the inner cylindrical pipe is rotatable and has likewise slotted outlet recesses extending parallel to the axis of said flow divider and associated with the slotted outlet recesses in said outer cylindrical pipe, and an outlet opening formed in one end face of said inner cylindrical pipe, and wherein said apparatus further comprises a float and a lever connecting said float with said flow divider, and extending through another closed end face of said inner cylindrical pipe.

* * * * *